United States Patent Office 3,061,340
Patented Oct. 30, 1962

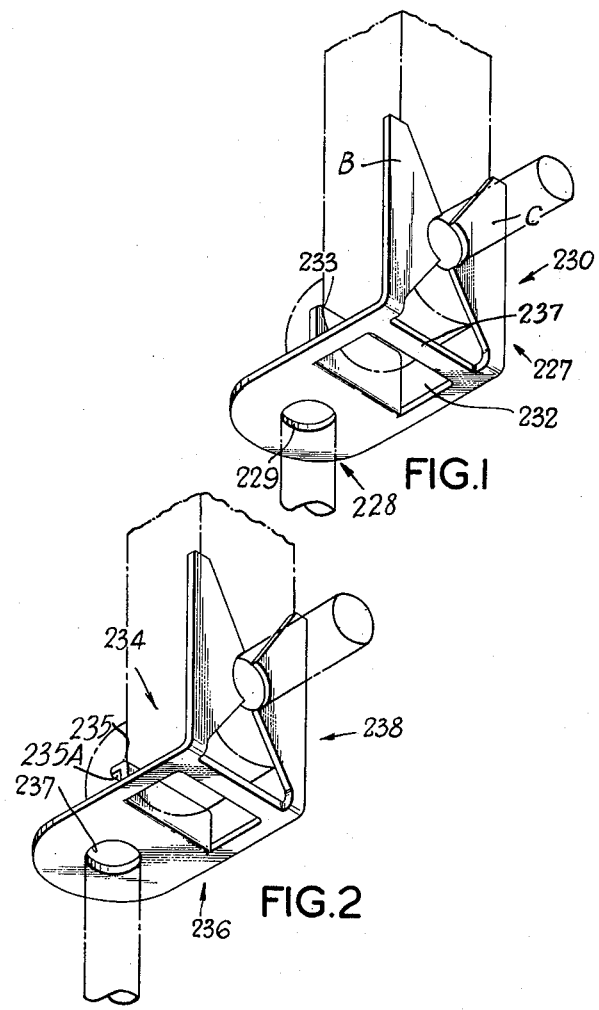

3,061,340
FASTENER
Eric Birger Fernberg, Northwood, and Clifford Alexander Seckerson, Uxbridge, England, assignors to F.T. Products Limited, London, England, a British company
Filed Oct. 14, 1959, Ser. No. 846,387
3 Claims. (Cl. 287—20.5)

The present invention relates to an improved fastener for articulating together a cranked member and an apertured member.

An articulated joint is known consisting of an apertured member such as a flat bar formed with a circular aperture, a rod having one end bent at right angles to form a crank which passes through the aperture in the bar, and a fastener which is used to prevent the bar from coming off the crank.

It is an object of the present invention to provide an articulated joint of this kind which has the following combination of features:

(a) The fastener is engaged with the crank in such a way as to prevent relative movement of the fastener and crank in the direction of the rod;

(b) The fastener is engaged with the rod in such a way as to prevent relative movement of the fastener and rod in the direction of the crank;

(c) The fastener bears against both faces of the apertured member so as to prevent it moving in either direction along the crank.

Preferred forms of the invention will now be described with reference to the accompanying drawings, in which:

FIGURES 1 and 2 are perspective views of two fasteners in accordance with the invention.

The fastener 227 illustrated in FIGURE 1 has a flat head 228 formed with an aperture 229 and a flat body 230 having two snap-engaging jaws C and B springing apart on a leaf spring 231, which leaf spring lies in the plane of the flat head 228. The head is formed with a cut-away aperture 232 the material from which is bent up to form a lug 233 spaced from and lying parallel with the flat body 230.

In use an apertured member such as a lever is placed between the lug and the body with its aperture in register with the aperture in the body 230. Then the crank is threaded through the hole 229 in the head and through the lever and snapped into the bifurcated body 230. Alternatively, after the lever has been engaged with the crank, the longitudinal portion of the rod may be passed downwardly through the hole 229 until its transverse crank snaps into the body 230.

The fastener 234 illustrated in FIGURE 2 is similar to that of FIGURE 1 except that the lug 235 has its free end bent to constitute a spacing flange 235 lying parallel with the head 236 of the fastener. This fastener is assembled on the members to be jointed by threading the rod through the hole 237 in the head, threading the lever on to the crank and finally snapping the crank into the body 238 so that the lever lies between the lug and the body with the spacing flange 235A spacing the lug 235 away from the bight or angle of the rod.

An important feature of each of the fasteners shown in FIGURES 1 and 2 is that the head of each fastener serves as a leaf spring attached at its ends to the ends of a pair of snap-engaging jaws lying in the plane of the body.

What we claim is:

1. An articulated joint comprising an apertured member; a rod bent so as to have a crank; a fastener consisting of a strip of resilient material bent to have a flat head portion disposed at approximately right angles to a flat body portion, said head portion being provided with a hole, said body portion being bifurcated to form a pair of snap-engaging jaws, the bifurcation extending from the free end of said body portion; wherein said apertured member is pivotally mounted on the crank portion of said rod with its aperture located in the angle between said head portion and said body portion of said fastener, said rod is extended through the hole in said head portion of said fastener and the crank portion thereof is snap-engaged within the snap-engaging jaws of said body portion of said fastener.

2. A fastener as claimed in claim 1, and having a lug integral with the head and spaced from the body so as to lie in the angle between the head and body.

3. A linkage clip comprising a flat head and two substantially parallel flat limbs facing each other and transversely directed with respect to said head, said head being provided with an aperture, one of said limbs being sheared and bent out of the head, the other of said limbs being flat and bifurcated and having a central aperture between the bifurcations to form a snap-engaging mouth, said other limb being formed at one end of said head.

References Cited in the file of this patent

UNITED STATES PATENTS

| 602,243 | Rybold | Apr. 12, 1898 |
| 1,968,557 | Johanson | July 31, 1934 |
| 2,894,771 | Putnam | July 14, 1959 |

FOREIGN PATENTS

| 220,746 | Austria | Mar. 16, 1959 |